US011475297B2

(12) United States Patent
Trim et al.

(10) Patent No.: US 11,475,297 B2
(45) Date of Patent: Oct. 18, 2022

(54) CROSS-DOMAIN HOMOPHILY QUANTIFICATION FOR TRANSFER LEARNING

(71) Applicant: International Business Machines Corporation, Armonk, NY (US)

(72) Inventors: Craig M. Trim, Glendale, CA (US);
Aaron K. Baughman, Research Triangle Park, NC (US); Maria del Pilar Belinchon Ballesta, Madrid (ES);
Susan Sylvia, Sacramento, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 588 days.

(21) Appl. No.: 16/553,798

(22) Filed: Aug. 28, 2019

(65) Prior Publication Data

US 2021/0064982 A1  Mar. 4, 2021

(51) Int. Cl.
*G06N 3/08* (2006.01)
*G06N 3/04* (2006.01)

(52) U.S. Cl.
CPC ............. *G06N 3/08* (2013.01); *G06N 3/0454* (2013.01)

(58) Field of Classification Search
CPC ........ G06N 3/0454; G06N 3/08; G06N 20/00; G06N 3/084; G06N 3/04; G06N 3/0445; G06N 7/005; G06N 3/0472; G06N 3/088; G06N 20/10; G06N 3/0481; G06N 20/20; G06N 3/063; G06N 5/003; G06N 5/04; G06N 3/082; G06N 3/006; G06N 3/02; G06N 5/022; G06N 5/02; G06N 3/0427; G06N 3/049

USPC .......................................................... 706/25
See application file for complete search history.

(56) References Cited

U.S. PATENT DOCUMENTS

| | | |
|---|---|---|
| 5,140,530 A | 8/1992 | Guha et al. |
| 6,241,069 B1 | 6/2001 | Mazur et al. |
| 8,795,523 B2 | 8/2014 | Su et al. |
| 9,542,626 B2 | 1/2017 | Martinson et al. |
| 2002/0143598 A1 | 10/2002 | Scheer |
| 2004/0131998 A1 | 7/2004 | Marom et al. |
| 2005/0119919 A1 | 6/2005 | Eder |
| 2005/0246297 A1 | 11/2005 | Chen et al. |

(Continued)

FOREIGN PATENT DOCUMENTS

WO  WO2019049127  3/2019

OTHER PUBLICATIONS

P. Mell, et al. "The NIST Definition of Cloud Computing", NIST Special Publication 800-145, Sep. 2011, Gaithersburg, MD.

(Continued)

*Primary Examiner* — Ajibola A Akinyemi
(74) *Attorney, Agent, or Firm* — Brian Restauro; George S. Blasiak; Heslin Rothenberg Farley & Mesiti PC

(57) ABSTRACT

Methods, computer program products, and systems are presented. The methods include, for instance: obtaining a pair of deep learning networks. A number of transferrable layers are determined and a homophily value indicating a level of similarity between layers of the same depth from the pair of the deep learning networks is determined. Upon ascertaining that the homophily value shows that the respective weight vectors of a layer of the same depth are to be combined based on a homophily threshold condition, the respective weight vectors for the layer is combined.

20 Claims, 6 Drawing Sheets

(56) References Cited

U.S. PATENT DOCUMENTS

| | | | |
|---|---|---|---|
| 2009/0248488 A1 | 10/2009 | Shah et al. | |
| 2016/0142266 A1* | 5/2016 | Carroll | H04L 41/14 706/12 |
| 2016/0171398 A1 | 6/2016 | Eder | |
| 2017/0024641 A1 | 1/2017 | Wierzynski | |
| 2017/0193400 A1 | 7/2017 | Bhaskar et al. | |
| 2017/0337464 A1 | 11/2017 | Rabinowitz et al. | |
| 2018/0302306 A1* | 10/2018 | Carroll | H04L 41/16 |
| 2019/0370645 A1* | 12/2019 | Lee | G06N 3/08 |
| 2021/0065013 A1 | 3/2021 | Trim et al. | |

OTHER PUBLICATIONS

D. Roy et al. "*Tree-CNN: A Hierarchical Deep Convolutional Neural Network for Incremental Learning*" Purdue University, arXiv:1802.05800v2, May 23, 2018.

M. Wang et al. "*Neural Network Meets DCN: Traffic-Driven Topology Adaptation with Deep Learning*", Association for Computing Machinery, Proc. ACM, Meas. Anal. Compu. Syst. vol. 2, No. 2, Article 26, Jun. 2018.

Anonymous, "*Methods for Deep Learning Network Compression for Resource-Constrained Devices*" IPCOM000246620D, Jun. 21, 2016.

Anonymous, "*A Method and System for Single-Image Depth Estimation Using Side Information*" IPCOM000253640D, Apr. 18, 2018.

J. Zhang et al. "*Multi-Task Dictionary Learning Based Convolutional Neural Network for Computer Aided Diagnoses with Longitudinal Images*" University of Michigan, arXiv:1709.00042v1, Aug. 31, 2017.

O. Mayer et al., "*Learning Unified Deep-Features for Multiple Forensic Tasks*" Association for Computing Machinery, IH&MM Sec'18, Jun. 20-22, 2018,.

A. Wang et al., "*Deep Transfer Learning for Crop Yield Prediction with Remote Sensing Data*" Association for Computing Machinery, Compass '18, Jun. 20-22, 2018.

"Smarter Supply Chain of the Future: Insights from the Global Chief Supply Chain Officer Study." IBM Institute for Business Value. 2010. https://www-935.ibm.com/services/us/gbs/bus/html/gbs-csco-study.html.

IBM press release. "Aerialtronics Commercial Drones Give IBM Watson Internet of Things a Bird's Eye View." 2016. https://www.ibm.com/press/us/en/pressrelease/50688.wss.

IBM case study. "Jabil Circuit implements a larger-scale analytics solution using IBM Analytics to reduce monthly close time." 2015. https://www-03.ibm.com/software/businesscasestudies/us/en/corp?synkey=M200424F25312E29.

IBM press release. "Local Motors Debuts 'Olli,' the First Self-driving Vehicle to Tap the Power of IBM Watson." 2016. http://www-03.ibm.com/press/us/en/pressrelease/49957.wss.

Lewis, Karen E. "Watson makes building management as a service possible." IBM Cloud computing news. 2017. https://www.ibm.com/blogs/cloud-computing/2017/02/watson-building-management-service/.

Butner, Karen, Dave Lubowe and Louise Skordby. "Who's leading the cognitive pack in digital operations?" IBM Institute for Business Value. Nov. 2016. https://www.ibm.com/services/us/gbs/thoughtleadership/cognitiveops.

Butner, Karen and Dave Lubowe. "Thinking out of the toolbox: How digital technologies are powering the operations revolution." IBM Institute for Business Value. Nov. 2015. http://www.ibm.com/services/us/gbs/thoughtleadership/operationstoolbox/.

Butner, Karen and Dave Lubowe. "The digital overhaul: Redefining manufacturing in a digital age." IBM Institute for Business Value. May 2015. http://www.ibm.com/services/us/gbs/thoughtleadership/digitalmanufacturing/.

List of IBM Patent and/or Patent Applications treated as related for U.S. Appl. No. 16/553,798, filed Aug. 28, 2019, dated Aug. 28, 2019.

A. Sharma et al. "*Distinguishing Between Personal Preferences and Social influence in Online Activity Feeds*", ACM, CSCW ' 16, Feb. 27-Mar. 2, 2016.

La Fond et al. "*Randomization Tests for Distinguishing Social Influence and Homophily Effects,*" WWW 2010, ACM, Apr. 26-30, 2010.

Q. Han et al. "*The Role of Peer Influence in Churn in Wireless Networks*" ACM, SocialCom '14, Aug. 4-7, 2014.

Y. Sun, "Automatically Designing CNN Architectures Using Genetic Algorithm for Image Classification," (Submitted on Aug. 11, 2018), https://arxiv.org/abs/1808.03818.

Y. Kanada, "Optimizing neural-network learning rate by using a genetic algorithm with per-epoch mutations," 2016 International Joint Conference onNeural Networks (IJCNN), Vancouver, BC, 2016, pp. 1472-1479.

I. Athanasiadis, A Framework of Transfer Learning in Object Detection for Embedded Systems (Submitted on Nov. 12, 2018 (v1), last revised Nov. 24, 2018 (this version, v2)) https://arxiv.org/abs/1811.04863.

F. Assunção, "DENSER: Deep Evolutionary Network Structured Representation." (Submitted on Jan. 4, 2018 (v1), last revised Jun. 1, 2018 (this version, v3)), https://arxiv.org/abs/1801.01563.

Maitrei Kohli, "Evolving Neural Networks Using Behavioural Genetic Principles", Mar. 1. 2017, 290 pgs., XP055557613, Retrieved from the Internet URL <http://www.dcs.bbk.ac.uk/site/assets/files/1025/mkohli.pdi>.

Tian Hatman et al., "Automated Neural Network Construction with Similarity Sensitive Evolutionary Algorithms", 2019 IEEE 20TH International Conference On Information Reuse and Integration for Data Science (IRI), IEEE, Jul. 30, 2019, pp. 283-290, XP033619124.

Tian Haiman et al., "Genetic Algorithm Based Deep Learning Model Selection for Visual Data Classification". 2019 IEEE 20TH International Conference On Information Reuse and Integration for Data Science (IRI), IEEE, Jul. 30, 2019, pp. 127-134, XPO33619173.

International Search Report and Written Opinion for PCT/EP2020/073727, completed Jan. 15, 2021, 17 pgs.

C. Fernando, "PathNet: Evolution Channels Gradient Descent in Super Neural Networks." (Submitted on Jan. 30, 2017) https://arxiv.org/abs/1701.08734; 16 pgs.

International Application Status Report for Publication No. WO2021/037840 from World International Property Organization (WIPO) generated Jun. 24, 2022; 2 pgs.

\* cited by examiner

CROSS-DOMAIN HOMOPHILY QUANTIFICATION FOR TRANSFER LEARNING

TECHNICAL FIELD

The present disclosure relates to machine learning technology, and more particularly to methods, computer program products, and systems for quantifying homophily influences across domains for transfer learning.

BACKGROUND

Conventionally, transfer learning is an effort to achieve and/or to improve machine learning in a target task or a target domain by transferring knowledge previously learnt in a source task or a source domain that are distinctive from one of the target task or and target domain. Each domain is defined by a pair of a feature space and a marginal probability distributions of the feature space. Each task is defined by a pair of a label space and a conditional probability distribution of the label space over a given feature space, respective to the source domain and the target domain. One of common conventional transfer learning scenarios indicates that the feature spaces of the source domain and the target domain can be different as in cases where documents are written in two different languages in a document classification example in the context of natural language processing. For the purpose of transfer learning, each domain is often represented by a type of deep neural networks that have multiple hidden layers. A tendency of an artificial neural network (ANN) to develop features of other ANNs that are similar to the ANN, rather than features of still other ANNs that are dissimilar to the ANN, had been observed, and is referred to as homophily amongst ANNs.

SUMMARY

The shortcomings of the prior art are overcome, and additional advantages are provided, through the provision, in one aspect, of a method. The method includes, for instance: obtaining, by one or more processor, a first network to a second network, wherein the first network and the second network are respective deep learning networks having a plurality of hidden layers; determining, by the one or more processor, a number of transferrable layers that can be transferred from the first network to the second network; quantifying, by the one or more processor, a homophily value between a first layer in the first network and a second layer in the second network, where the homophily value indicates a level of similarity between the first layer and the second layer as a preconfigured function of a first weight vector of the first layer and a second weight vector of the second layer, where the transferrable layers include the first layer and the second layer, and where the first layer and the second layer are of the same depth in the first network and the second network respectively; ascertaining, by the one or more processor, that the first weight vector and the second weight vector are similar enough to be combined together based on the homophily value and a homophily threshold condition; and combining, by the one or more processor, the first weight vector and the second weight vector to produce a new weight vector that represents both the first weight vector and the second weight vector.

Additional features are realized through the techniques set forth herein. Other embodiments and aspects, including but not limited to computer program products and systems, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
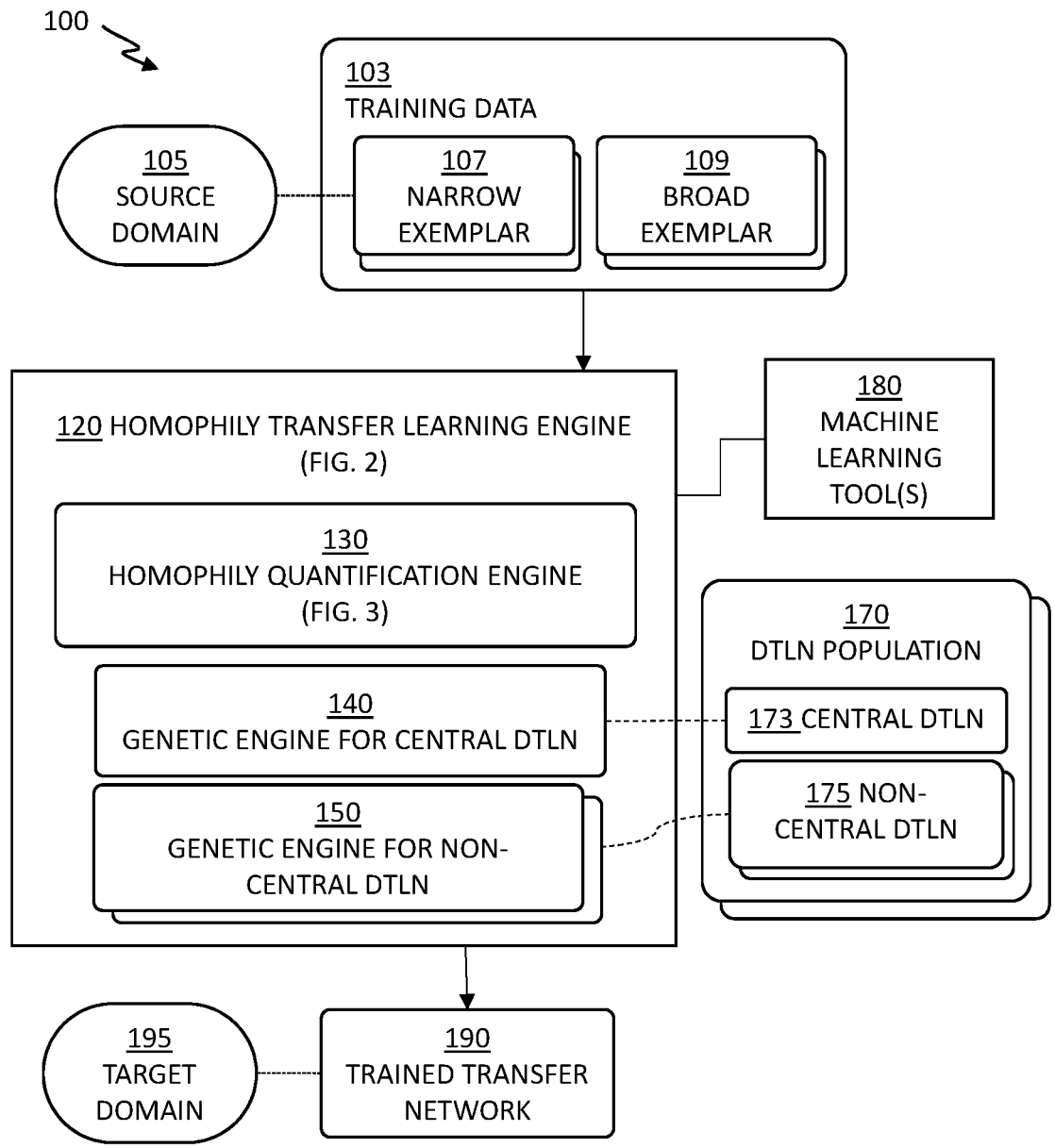
FIG. 1 depicts a system for transfer learning by homophily, in accordance with one or more embodiments set forth herein.

FIG. 1 depicts a system 100 for transfer learning by homophily, in accordance with one or more embodiments set forth herein.

Embodiments of the present invention recognize that a machine learning model for a task or a domain is commonly applicable only in the same task or the same domain as the training data from which the machine learning model was built. Embodiments of the present invention also recognize that building and training only one machine learning model is extremely expensive in terms of time and resource required to achieve a usable functionality. Embodiments of the present invention recognize that improvement with machine learning on cross-domain applicability has been attempted in transfer learning, in which a machine learning in a target task/domain is achieved by transferring knowledge previously learnt in a source task/domain. Embodiments of the present invention recognize that, in transfer learning, the source task/domain is distinctive from the target task/domain but the knowledge on the source task/domain can be generalized into the target task/domain.

Embodiments of the present invention recognize that deep learning processes typically perform best with a lot of data and patterns that are difficult for traditional machine learning models. Embodiments of the present invention also recognize that deep learning augments traditional learning by finding and discovering features or predictor data that can be used within traditional machine learning models. Embodiments of the present invention further recognize that many machine learning models are similar in both training of weights and topology of learning networks.

Embodiments of the present invention measures the similarity between a pair of neural networks to facilitate a transfer learning process with the same topology or similar topologies for the pair of neural networks for efficiency in the transfer learning process.

The number of machine learning models respective to each narrow area of interest would substantially increase over time as the areas of interest are expanded, and a group of compatible machine learning models for the respective areas of interest can coevolve by use of transfer learning. The machine learning technology of transfer learning would facilitate the body of knowledge from each machine learning model to cumulate and to be shared, such that training of the machine learning models can be improved in a manner more efficient than training individual machine learning models for each narrow area of interest.

Transfer learning indicates a type of machine learning where a body of knowledge in a source domain is transferred to another domain that is distinctive from the source domain. Embodiments of the present invention recognize that transfer learning is a type of machine learning that utilizes knowledge transferred from a machine learning model, that is often a neural network of a deep architecture with many hidden layers, of the source task/domain in building a machine learning model for the target task/domain, such that machine learning in the target task/domain can be done more efficiently than performing machine learning from the scratch for the target task/domain.

Embodiments of the present invention recognize that transfer learning would be a way to achieve a broad AI system that can be applicable to certain other areas of interest than the narrow area of interest for which the machine learning model is trained, and, ultimately, a general AI system, in which the machine learning model can apply knowledge obtained from a specific narrow area of interest to all areas of interest, as human beings apply a certain knowledge to any other endeavor regardless of the area of interest from which the knowledge originates. Embodiments of the present invention recognize that transfer learning can improve a machine learning process for the target task by providing ways to achieve improved initial performance, improved learning curve, and improved final performance with a machine learning model for the target task, as compared to another machine learning model that does not utilize the transfer of knowledge.

Embodiments of the present invention recognize that machine learning in a target task and/or a target domain can be achieved by transferring knowledge previously learnt in a source task and/or a source domain that is distinctive from at least one of the target task and the target domain in conventional transfer learning, particularly in classification tasks. Embodiments of the present invention recognize that each domain is defined by a pair of a feature space and a marginal probability distributions of the feature space, respective to the source domain and the target domain. Embodiments of the present invention also recognize that each task is defined by a pair of a label space and a conditional probability distribution of the label space over a given feature space, respective to the source domain and the target domain.

Embodiments of the present invention also recognize that one of common conventional transfer learning scenarios indicates that the feature spaces of the source domain and the target domain can be different as in cases where documents of similar subjects are written in two different languages in a document classification example in the context of natural language processing. Embodiments of the present invention further recognize that an objective of transfer learning is to enable the machine learning model to learn the target conditional probability distribution of respective labels in the target labels over each target feature in the target domain with the information gained from the source domain and the source task, without training the target conditional probability distribution with training data of pairs of target features and target labels corresponding to the target feature.

Consistently with common usage of the term transfer learning, in this specification, terms "transfer layer", "contribution layer", and "rolling layer" interchangeably indicate a body of knowledge that is being transferred from the source task/domain to the target task/domain, as being represented as a weight vector of a layer of a deep learning neural network for the source task/domain, in which a plurality of layers can contribute to transfer learning of another deep learning neural network for the target task/domain. The weight vector represents a series of weights for all nodes in the layer of the neural network. The weights for respective nodes can be regarded as the respective weights assigned for the outcomes of the nodes, that is, where the weights are associated with respective connections to the next layer of the learning network, rather than the node itself. Conventionally transfer learning is performed on learning networks of the same topology, where the learning networks have the same number of nodes respectively connected in the same manner to a next layer of nodes.

In the context of sociology, term "homophily" indicates an internal preference of people to have non-negative ties with who are similar to themselves in socially significant way. In this specification, term "homophily" is applied to artificial neural networks (ANNs), instead of people, and accordingly, indicates a tendency of a machine learning model, represented as an ANN, to develop features appearing in other ANNs that are similar to the ANN. In this specification, term "homophily influence" indicates influences from the other similar ANN that induces the homophily on the ANN.

Accordingly, in this specification, a machine learning model (ANN) of the source task/domain exerts homophily influences on the target task/domain, and a machine learning model (ANN) of the target task/domain demonstrates a certain degree of homophily influence by the machine learning model of the source task/domain, in manners consistent with embodiments of the present invention as presented herein. In this specification, term task, as used in "source task" and "target task", indicates an objective to achieve by use of machine learning, and similarly, term domain, as used in "source task" and "target task", is an identifiable field of application in which the task is performed and/or from which training data for the machine learning model for the task originate. Examples of tasks in the context of machine learning include, but are not limited to, labeling/classification on unstructured data, speech recognition/automated response in the context of natural language processing, etc. In this specification, an instance of ANN of a predefined deep architecture with many hidden layers subject to transfer learning as performed by the homophily transfer learning engine 120 is referred to as a deep transfer learning network (DTLN).

The system 100 includes training data 103 for a source domain 105, a homophily transfer learning engine 120, one or more machine learning tool 180, and a trained transfer network 190 for a target domain 195. In this specification, the source domain 105 is inclusive of source tasks where the source domain and the source tasks are not explicitly treated as separate. Also, in this specification, the target domain 195 is inclusive of target tasks where the target domain and the target tasks are not explicitly treated as separate. The training data 103 are inputs to the homophily transfer learning engine 120 and the trained transfer network 190 is an output of the homophily transfer learning engine 120. The one or more machine learning tool 180 is operatively coupled to the homophily transfer learning engine 120 and provides functionalities for machine learning framework such as various machine learning modeling, training, predictive modeling, and deep learning.

The training data 103 include a plurality of narrow exemplars 107 applicable to respective domains, including the source domain 105 and the target domain 195, and a plurality of broad exemplars 109 applicable to both the source domain 105 and the target domain 195, and possibly to still other additional domains. Embodiments of the present invention recognize that "exemplar" indicates a data point that is representative of a group of data points, which is a subset of the training data 103. In this specification, other data points of the training data 103 are deemed as being represented by the narrow exemplars 107 for the source domain 105, the narrow exemplars 107 for the target domain 195, or the broad exemplars 109. The training data 103 can further include other narrow exemplars 107 that correspond to a third domain distinctive from the source domain 105 and the target domain 195.

The narrow exemplars 107 of the training data 103 include a various distinctive sets of narrow exemplars, a set of which is applicable to and/or collected from the source domain 105 and another set of which is applicable to and/or collected from the target domain 195. The narrow exemplars 107 of the training data 103 can further include any other sets of exemplars that are respectively applicable to and/or collected from a third domain relevant to either the source domain 105 or the target domain 195 that is distinctive from both the source domain 105 and the target domain 195.

The homophily transfer learning engine 120 generates the trained transfer network 190 for the target domain 195 based on the inputs of the training data 103 and by transferring knowledge from the source domain 105. The homophily transfer learning engine 120 generates and concurrently manipulates a number of deep transfer learning networks (DTLNs) selected from the population of the DTLNs 170 by use of a corresponding type of genetic engine 140, 150. A genetic engine for central DTLN 140 of the homophily transfer learning engine 120 is to handle a central DTLN 173 of the DTLN population 170. A plurality of genetic engines for non-central DTLN 150 of the homophily transfer learning engine 120 is to handle a plurality of non-central DTLNs 175 of the DTLN population 170. In this specification, the central DTLN 173 indicates a deep transfer learning network for the target domain 195 initialized with narrow exemplars applicable for the target domain 195. The rest of DTLNs in the DTLN population 170 are referred to as the non-central DTLNs 175.

The non-central DTLNs 175 are generally of two categories of showing strong homophily to the source domain 105 and of showing weak to no homophily, which is referred to as inverse homophily, to the source domain 105. As previously indicated, the term "homophily" indicates a tendency of ANNs, that is, instances of the DTLNs from the population of the DTLNs 170, developing features appearing in other DTLNs similar to itself. Accordingly, the central DTLN 173 originally representing only the target domain 195 can be trained with the knowledges acquired while training the non-central DTLNs 175 for the source domain 105, having either homophily or inverse homophily with the source domain 105.

The homophily transfer learning engine 120 includes a homophily quantification engine 130, the genetic engine for central DTLN 140, and the plurality of genetic engines for non-central DTLN 150. The homophily quantification engine 130 of the homophily transfer learning engine 120 quantifies the homophilous influence between the central DTLN 173 and each of non-central DTLNs 175 based on how similar or dissimilar a presently compared non-central DTLN 175 is to the central DTLN 173. Both the genetic engine for central DTLN 140 and the genetic engines for non-central DTLN 150 invokes the homophily quantification engine 130.

The homophily transfer learning engine 120 produces the central DTLN 173 as the trained transfer network 190 for the target domain 195, if the genetic engine for central DTLN 140 determines that the central DTLN 173 meets a certain fitness threshold condition, after all instances of the genetic engine for non-central DTLN 150 completes transferring all the weights of transferrable layers that meet a certain transfer condition from the non-central DTLNs 175 to the central DTLN 173. The trained transfer network 190 for the target domain 195 is initialized with the narrow exemplar 107 applicable for the target domain 195 and is trained with knowledge acquired during training one of the non-central DTLN 175 for the source domain 105. An overview of operations by the homophily transfer learning engine 120 are presented in FIG. 2 and corresponding descriptions. Detailed operations of the homophily quantification engine 130 are presented in FIG. 3.

In the same embodiment of the present invention, the homophily transfer learning engine 120 runs a single thread of the genetic engine for central DTLN 140 while running a plurality of threads of the genetic engine for non-central DTLNs 150. All threads of the genetic engines for non-central DTLNs 150 respectively communicate with the thread of the genetic engine for central DTLN 140 by accessing the central DTLN 173, for measuring homophily influence on all non-central DTLNs 175 as well as for migrating weight vectors of the non-central DTLNs 175 to the central DTLN 173. Respective threads of the genetic engines 140, 150 invoke a thread of the homophily quantification engine 130 to quantify the level of the homophilous influence of the central DTLN 173 on each of non-central DTLNs 175. Similarly with the genetic engines 140, 150, the homophily transfer learning engine 120 runs a plurality of threads of the homophily quantification engine 130 concurrently.

In certain embodiments of the present invention, the homophily transfer learning engine 120 generates at least three (3) instances of the DTLNs 170 including the central DTLN 173 and two (2) instances of the non-central DTLNs 175. A non-central DTLN 175 that is most similar to the source domain is referred to as a homophilous DTLN. Another non-central DTLN 175 that is most dissimilar to the source domain is referred to as an inverse homophilous DTLN. The central DTLN 173 can be initialized to represent narrow exemplars 107 for the target domain 195, and is to be developed into the trained transfer network 190 for the target domain 195 as trained by knowledge cumulated while training the source domain 105. The homophily transfer learning engine 120 produces the central DTLN 173 as the trained transfer network 190 for the target domain 195 at the conclusion of operations by the genetic engine for central DTLN 140. A plurality of threads of the respective genetic engines 140, 150, run concurrently operating on each of the DTLNs 170, as represented by a dashed coupling between the DTLNs 173, 175 and the genetic engines 140, 150 in FIG. 1.

Each of the genetic engines 140, 150 respectively implements a heuristic process that mimics the process of natural evolution on the subject DTLN encoded as a respective chromosome, to generate useful solutions to optimization and search problems, by use of techniques including, but not limited to, inheritance, mutation, selection, and crossover, which are mechanisms of natural evolution.

Figure 2:
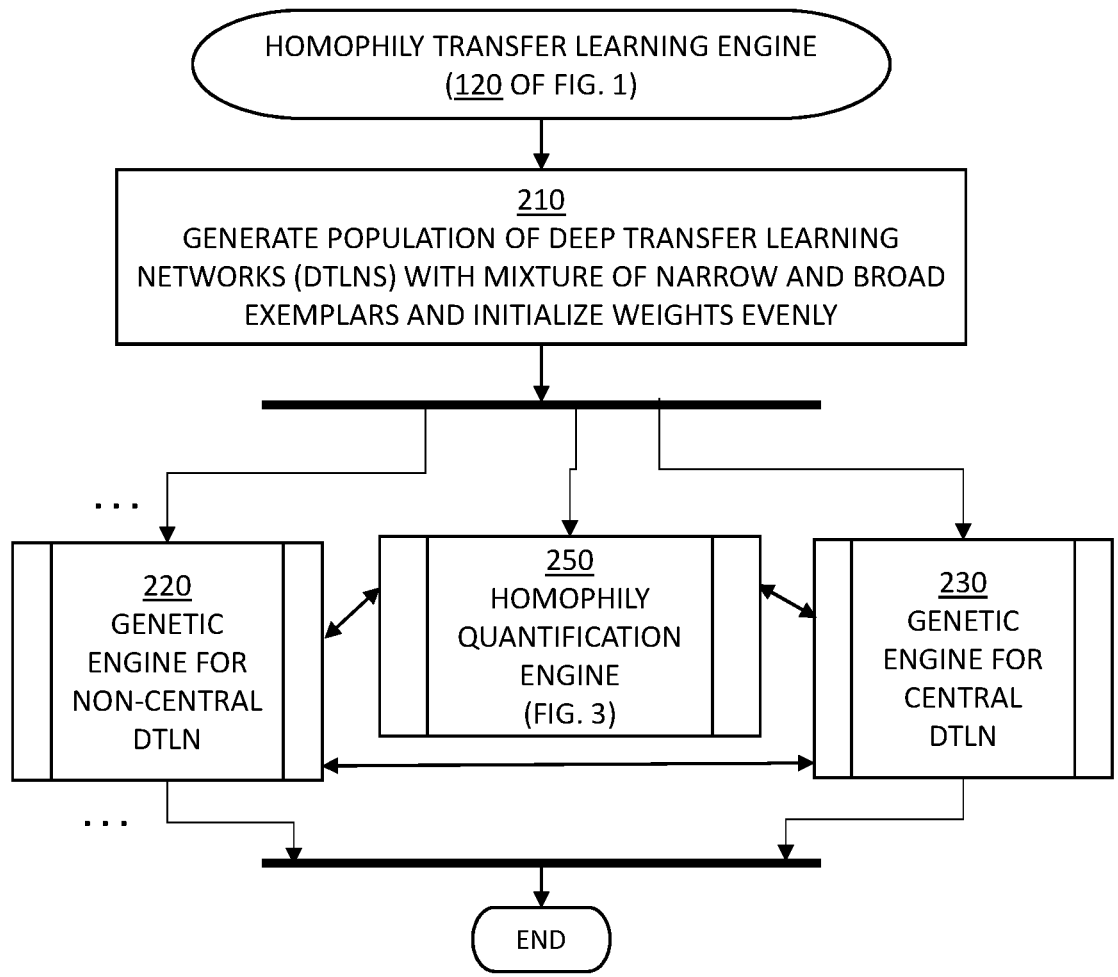
FIG. 2 depicts a flowchart of operations performed by the homophily transfer learning engine, in accordance with one or more embodiments set forth herein.

FIG. 2 depicts a flowchart of operations performed by the homophily transfer learning engine 120, in accordance with one or more embodiments set forth herein.

Embodiments of the present invention recognize that present efforts to increase applicability of one learning model (DTLN) to another include various types of combination of learning models as in ensembling, chaining, and/or merging processes for learning models. Embodiments of the present invention improves known solutions of combining learning models by automatically discovering a degree of knowledge to transfer from one of the non-central DTLN 175 to the central DTLN 173 for the target domain 195, by automatically determining as to how or if the knowledge from the source domain 105 should be combined/transferred to the central DTLN 173, and by maintaining hierarchical features of the respective DTLNs for both the source domain 105 and the target domain 195.

In block 210, the homophily transfer learning engine 120 generates a population of the deep transfer learning networks (DTLNs) 170 based on the training data 103 with mixture of the narrow exemplars 107 and the broad exemplars 109. The homophily transfer learning engine 120 subsequently initializes weights on all layers of each DTLN in the population of DTLNs 170 evenly. Then the homophily transfer learning engine 120 proceeds with parallelly processing blocks 220, 230, and 250.

In certain embodiments of the present invention, the homophily transfer learning engine 120 generates at least three (3) instances of the DTLNs 170 including the central DTLN 173 and at least two (2) instances of the non-central DTLNs 175. One of the at least two instances of the non-central DTLNs 175 that is most similar to the source domain 105 is referred to as a homophilous DTLN. Another of the at least two instances of the non-central DTLNs 175 that is most dissimilar to the source domain 105 is referred to as an inverse homophilous DTLN. The homophily transfer learning engine 120, based on a concerted operations of the genetic engine for central DTLN 140 and the genetic engine for non-central DTLN 150, would develop the central DTLN 173 into the trained transfer network 190 for the target domain 195 by transferring weights from transfer layers of both of the non-central DTLNs 175 including the homophilous DTLN and the inverse homophilous DTLN. The genetic engine for central DTLN 140, on behalf of the homophily transfer learning engine 120, produces the central DTLN 173 as the trained transfer network 190 for the target domain 195, once all instances of the training data 103 are learnt and the central DTLN 173 meets a fitness threshold condition for the target domain 195. The homophily transfer learning engine 120 practically and efficiently broadens applicability of the central DTLN 173 initially established for the source domain 105 to be functional with the target domain 195, by transferring layers of the non-central DTLNs 175 to the central DTLN 173 according to the level of homophily between the one of the non-central DTLNs 175 and the central DTLN 173, when such transfer would contribute to broadening the central DTLN 173 to be usable for the target domain 195.

As noted, in certain embodiments of the present invention, the homophily transfer learning engine 120 runs a single thread of the genetic engine for central DTLN 140 while running a plurality of threads of the genetic engine for non-central DTLNs 150. All threads of the genetic engines for non-central DTLNs 150 respectively communicate with the thread of the genetic engine for central DTLN 140 by accessing the central DTLN 173, for measuring, by use of the homophily quantification engine 130, homophily influence on all non-central DTLNs 175 as well as for migrating weight vectors of the non-central DTLNs 175 to the central DTLN 173 when appropriate.

As noted above, the population of the DTLNs 170, both the central DTLN 173 and the non-central DTLNs 175, are respective instances of neural network of a deep architecture. In certain embodiments of the present invention, all DTLNs 170 subject to operations of the homophily transfer learning engine 120 are of the same topology, indicating the same number of nodes in each layer of the DTLNs 170, having the same connection to the respective next layers in each DTLN. The term "topology" typically indicates the way nodes of a neural network are connected. In other embodiments of the present invention, each of the DTLNs 170 can be of a distinctive topology. The homophily quantification engine 130 deals with comparing the DTLNs 170 of distinctive topologies for homophily and prepares weights for transfer.

In the same embodiments of the present invention as above, an activation function of each node, often referred to as a neuron, in the respective DTLNs 170 defines the output of the respective node based on the input(s) to the node. Within the activation function, a certain input can be biased toward the output in comparison to other entry of the input. Such bias, or ratio of contribution, toward the output of the input is referred to as weights parameterized within the activation function for respective inputs. In the context of operations by the homophily transfer learning engine 120, a transfer layer of a neural network from the population of the DTLNs 170 is represented as a weight vector for the layer, provided that the activation function is uniform for all nodes in the subject DTLN 170. The activation function for nodes in the DTLN 170 is typically a nonlinear function to facilitate the DTLN 170 to perform nontrivial task without using massive number of nodes. Typically in the context of the ANN, the activation function can also be referred to as a transfer function, which transfers inputs to outputs. In this specification, however, as the term transfer layers indicates a plurality of layers where weight vectors are transferred from one DTLN to another DTLN, the activation function for each node would be referred as the activation function.

In certain embodiments of the present invention, the homophily transfer learning engine 120 initializes the weights on respective layers of the population of the DTLNs 170 evenly. The respective weights can be later updated by use of batch backpropagation as the weights of the respective DTLNs 170 evolves during respective training.

In the same embodiments of the present invention, the respective instances of the DTLNs 170 can also have hyper-parameters other than the weights for layers. Examples of hyper-parameters of a DTLN from the population of the DTLNs 170 include, but are not limited to, a type of the architecture, respective type of each edge where edges are not uniform according to the type of the architecture, a number of neurons, a number of layers, a learning rate eta ($\eta$), a regularization penalty lambda ($\lambda$), momentum, a number of epochs, batch size, dropout, and any other attribute of the DTLN as a whole.

In block 220, the homophily transfer learning engine 120 performs one or more thread of the genetic engine for non-central DTLN 150. As noted, the homophily transfer learning engine 120 parallelly runs a thread of the homophily quantification engine 130 in block 250, a plurality of threads of the genetic engine for non-central DTLN 150 in block 220, respective each of the non-central DTLNs 175 that is currently in training, as well as a thread of the genetic engine for central DTLN 140 for the central DTLN 173 in block 230. Each non-central DTLN 175 can contribute to the central DTLN 173 upon passing a preconfigured fitness threshold. Each thread of the genetic engine for non-central DTLN 150 interacts with the thread of the genetic engine for central DTLN 140, as represented by a bidirectional arrow between block 220 and block 230. Similarly, each thread of the genetic engine for non-central DTLN 150 interacts with the thread of the homophily quantification engine 130 of block 250, as represented by a bidirectional arrow between block 220 and block 250. Operations of the genetic engine for non-central DTLN 150 in combination with the genetic engine for central DTLN 140 are presented in descriptions of FIG. 1 above. Then, the homophily transfer learning engine 120 terminates a current thread of the genetic engine for non-central DTLN 150.

In block 230, the homophily transfer learning engine 120 performs a thread of the genetic engine for central DTLN 150. As noted, the homophily transfer learning engine 120 parallelly runs the thread of the homophily quantification engine 130 in block 250, the plurality of threads of the genetic engine for non-central DTLN 150 in block 220, respective to each of the non-central DTLNs 175 that is currently in training, as well as the thread of the genetic engine for central DTLN 140 for the central DTLN 173 in block 230. The genetic engine for central DTLN 150 crosses over each non-central DTLN 175 under training repeatedly if the non-central DTLN 175 passes the preconfigured fitness threshold. The thread of the genetic engine for central DTLN 140 in block 230 interacts with each thread of the genetic engine for non-central DTLN 150 in block 220, as represented by a bidirectional arrow between block 230 and block 220. Similarly, the thread of the genetic engine for central DTLN 140 in block 230 interacts with the thread of the homophily quantification engine 130 of block 250, as represented by a bidirectional arrow between block 230 and block 250. Operations of the genetic engine for central DTLN 140 in combination with the genetic engine for non-central DTLN 150 are presented in descriptions of FIG. 1 above. Then, the homophily transfer learning engine 120 terminates the thread of the genetic engine for central DTLN 140.

In block 250, the homophily transfer learning engine 120 performs a thread of the homophily quantification engine 130. As noted, the homophily transfer learning engine 120 parallelly runs the thread of the homophily quantification engine 130 in block 250, the plurality of threads of the genetic engine for non-central DTLN 150 in block 220, respective to each of the non-central DTLNs 175 that is currently in training, as well as the thread of the genetic engine for central DTLN 140 for the central DTLN 173 in block 230. The thread of the homophily quantification engine 130 of block 250 interacts with the thread of the genetic engine for central DTLN 140 in block 230, as represented by a bidirectional arrow between block 230 and block 250. Details on operations of the homophily quantification engine 130 are presented in FIG. 3 and corresponding description. Then, the homophily transfer learning engine 120 terminates the thread of the homophily quantification engine 130.

Figure 3:
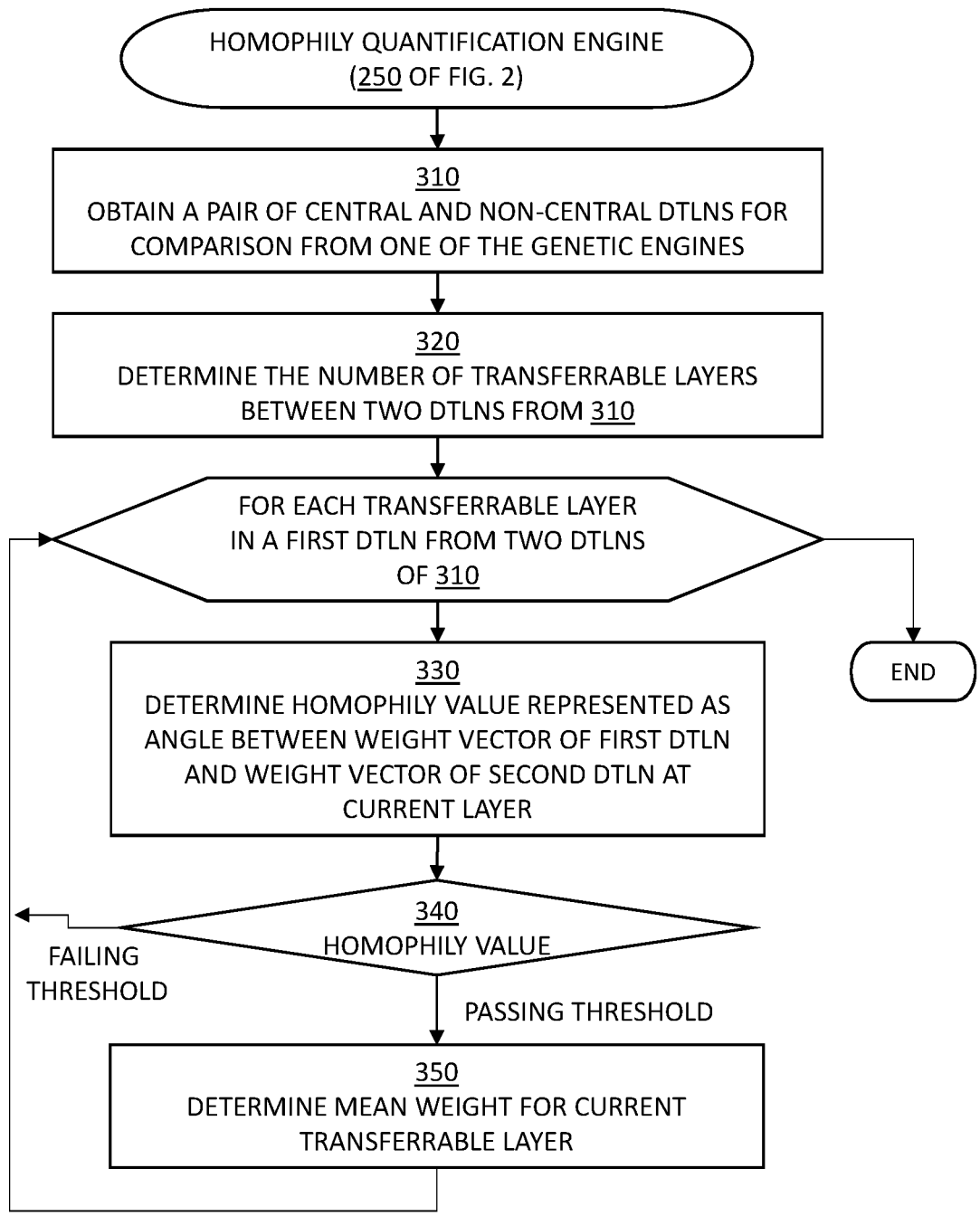
FIG. 3 depicts a flowchart of operations performed by the homophily quantification engine in block 250 of FIG. 2, in accordance with one or more embodiments set forth herein.

FIG. 3 depicts a flowchart of operations performed by the homophily quantification engine 130 in block 250 of FIG. 2, in accordance with one or more embodiments set forth herein.

In block 310, the homophily quantification engine 130 obtains two (2) DTLNS for comparison from one of the genetic engines 140, 150. Both the genetic engine for central DTLN 140 and the genetic engine for non-central DTLN 150 respectively invokes the homophily quantification engine 130 to measure a level of homophily for a pair of the central DTLN 173 and one of the non-central DTLN 175 while processing a respective subject DTLN 173, 175, as noted earlier. Then the homophily quantification engine 130 proceeds with block 320.

In block 320, the homophily quantification engine 130 determines the number of layers transferrable between the pair of the central DTLN 173 and one of the non-central DTLN 175 as obtained from block 310. Then the homophily quantification engine 130 proceeds with block 330.

In certain embodiments of the present invention, the homophily quantification engine 130 determines the number of layers transferrable between the pair of the central DTLN 173 and one of the non-central DTLN 175, denoted as z, as a floor integer of the ratio of hidden layer depths as shown below based on respective numbers of layers in the pair of the central DTLN 173 and one of the non-central DTLN 175.

$$z = \left\lfloor \frac{\min(|N_1|, |N_2|)}{\max(|N_1|, |N_2|)} \times \min(|N_1|, |N_2|) \right\rfloor$$

The central DTLN 173 from the pair, or a first network, is denoted as $N_1$ and the one of the non-central DTLN 173 from the pair, or a second network, is denoted as $N_2$. A number of layers in the first network is denoted as $|N_1|$, and a number of layers in the second network is denoted as $|N_2|$. Function min(arg1, arg2) returns the least value of the provided arguments, represented by arg1 and arg2, and function max(arg1, arg2) returns the greatest value of the provided arguments.

When the number of layers in the first network is the same as the number of layers in the second network, that is, $|N_1|=|N_2|$, then $z=|N_1|$. The number of layers transferrable between the pair of $N_1$ and $N_2$, z value is to scale outputs of the layers in one network of the pair of $N_1$ and $N_2$ into the other of the pair of $N_1$ and $N_2$ for transfer.

In the same embodiment of the present invention, by use of configuring the number of transferrable layers (z) as the less number of layers between the two DTLNs, the homophily quantification engine 130 ensures that the transfer between the pair of DTLNs from block 310 would be across layers present in both of the two DTLNs, and would not transfer any layers present in only one of the two DTLNs. For example, if the $|N_1|=4$, and $|N_2|=5$, and accordingly, $$z = \left\lfloor \frac{16}{5} \right\rfloor = 3$$

then the homophily quantification engine 130 averages together weights of three (3) layers between both networks, regardless of respective numbers of layers in each of the two DTLNs.

The homophily quantification engine 130 performs blocks 330, 340, and 350 as a unit for each transferrable layer in the first network from the pair of networks obtained from block 310.

In block 330, the homophily quantification engine 130 determines a homophily value represented as an angle between a weight vector of the first network and a weight vector of the second network at a current transferrable layer. Then the homophily quantification engine 130 proceeds with block 340.

In certain embodiments of the present invention, the homophily quantification engine 130 determines the homophily value represented as the angle between the weight vector of the first network and the weight vector of the second network at the current transferrable layer, denoted as theta (θ) as below:

$$\theta = acos\left(\frac{x_{1m} \cdot x_{2m}(|x_{1m}|)}{|x_{1m}||x_{2m}(|x_{1m}|)|}\right)$$

where acos(val) indicates arccosine of value val, which is the inverse function of the cosine function and calculates the angle for a given cosine value val, $x_{1m}$ indicates the weight vector (x) of the first network ($N_1$) at the current transferrable layer (m), $x_{2m}$ indicates the weight vector (x) of the second network ($N_2$) at the current transferrable layer (m), and $x_{2m}(|x_{1m}|)$ indicates a fill-up weight vector for a shorter weight vector between $x_{1m}$ and $x_{2m}$, in which the length of the fill-up weight vector is the same as a longer weight vector between $x_{1m}$ and $x_{2m}$, and the weight values for the filled-up portion of the fill-up vector is borrowed from the longer weight vector. The fill-up weight vector is devised to compensate differences in topologies of respective networks and layers in calculating the homophily values. For example, provided $x_{1m}$=(1 4 6 8 2 5) and $x_{2m}$=(1 3 4), then $x_{2m}(|x_{1m}|)$=(1 3 4 8 2 5), and the length of the fill-up weight vector, denoted as $|x_{2m}(|x_{1m}|)|$, is six (6) The numerator $x_{1m} \cdot x_{2m}(|x_{1m}|)$ indicates a dot product of two weight vectors $x_{1m}$ and $x_{2m}(|x_{1m}|)$, of which value is the product of respective magnitudes of the two weight vectors and the cosine of the angle between the two weight vectors.

Accordingly, the range of $$val = \frac{x_{1m} \cdot x_{2m}(|x_{1m}|)}{|x_{1m}||x_{2m}(|x_{1m}|)|}$$

is between negative one and one, including negative one and one, that is, [−1, 1], as normalized for the acos(val), and the range of angle theta (θ) is between zero radian and pi (π) radian, that is, [0, π].

The homophily value represented as the angle theta (θ) is indicative of similarities between two layers being compared from the respective DTLN, and accordingly, if the angle theta is zero, that is, θ=0, then the two layers $x_{1m}$ and $x_{2m}$ are identical and have the greatest level of homophily. If the angle theta is one hundred and eighty (180) degrees, that is, θ=π, then the two layers $x_{1m}$ and $x_{2m}$ are opposite and have the maximum level of inverse homophily.

In block 340, the homophily quantification engine 130 determines if the homophily value measured from block 330 satisfies a homophily threshold condition. If the homophily quantification engine 130 determines that the homophily value measured from block 330 passes the homophily threshold condition, then the homophily quantification engine 130 proceeds with block 350. If the homophily quantification engine 130 determines that the homophily value measured from block 330 fails the homophily threshold condition, then the homophily quantification engine 130 loops back to block 330 for a next layer in the first neural network.

The homophily threshold condition is configured to meet the purpose of the transfer learning. In certain embodiments of the present invention, the homophily threshold condition is configured to drive the source domain 105 and the target domain 195 to converge for broad applicability by setting the homophily threshold value to a certain way, for example, less strict. The homophily threshold value indicates how similar the topologies of the two DTLNs at the current transferrable layer should be to combine the weights for the respective layers in contribution to the trained transfer network 190. For example, the homophily threshold condition can be configured to converge any layers that are seventy-five percent (75%) similar with each other, that is, θ=π/4 or less, to combine weights together. Or it is desirable to explore a domain that is distinctive from both the source domain 105 and the target domain 195, the homophily threshold condition can be configured to converge any layers that are twenty-five percent (25%) similar with each other, that is, θ=3π/4 or less, to combine weights together.

In other embodiments of the present invention, the homophily threshold condition can be configured to drive the source domain 105 and the target domain 195 to divert to refine certain domain-specific characteristics, by setting the homophily threshold condition very high, for example, θ=π/6 or less, to combine the weights of the layers.

In block 350, the homophily quantification engine 130 determines a mean of weights for the current transferrable layer. The mean of weights of the current transferrable layers respectively from the pair of DTLNs can form a new weight vector for one of the pair of DTLNs, or another DTLN as an output. The homophily transfer learning engine 120 maintains the weight vectors of the pair of DTLNs for training log. Then the homophily quantification engine 130 loops back to block 330 for a next transferrable layer in the first neural network.

The homophily quantification engine 130 accelerates the process of transfer learning within deep learning while maintaining accuracy for the mixed set of knowledge for the source domain 105 and the target domain 195.

The homophily quantification engine 130 compares topologies of the two DTLNs 170 that had been selected for processing and determines which layers and their respective weights of one DTLN 170 from the selected two DTLNs 170 are to be transferred to other DTLN 170. The homophily quantification engine 130 can select from no layer to all layers for transfer from one DTLN 170 to the other DTLN 170, provided the two DTLNs share the same topology. When a subset of layers in one DTLN 170 is selected for transfer, and then the weights of the selected layers combined with the corresponding layers of the other DTLN 170, then, the result would be a transfer network representing knowledges from original training data, that is, the target domain 195, and the transferred domain, that is the source domain 105.

Certain embodiments of the present invention improve efficiency in time and resources for developing a broad artificial intelligence (AI) system by transferring knowledge from a source domain to a target domain based on homophily influence. Certain embodiments of the present invention automatically discover a degree of knowledge, in the number of layers in respective deep transfer learning networks, to transfer from one of the non-central DTLN to the central DTLN for the target domain. Certain embodiments of the present invention automatically determine how or if the knowledge from one DTLN should be combined/transferred to the other DTLN, and automatically combines the layers of the two DTLN according to the decision. Certain embodiments of the present invention maintaining hierarchical features of the respective DTLNs for both the source domain and the target domain in the trained transfer network 190. Certain embodiments of the present invention are directly applicable to existing AI system APIs platform across multiple domains. Certain embodiments of the present invention significantly reduce time and resources necessary for training a new AI system for other domain that is homophilous to other preexisting narrow AI systems by transferring the knowledge from the preexisting AI systems and by broadening the applicability of the new AI system in the process based on the level of homophily. Certain embodiments of the present invention may be implemented by use of a cloud platform/data center in various types including a Software-as-a-Service (SaaS), Platform-as-a-Service (PaaS), Database-as-a-Service (DBaaS), and combinations thereof based on types of subscription. Services offering certain embodiments of the present invention can be provided for subscribed business entities/vendors of software applications in need from any location in the world over network communication.

Figure 4:
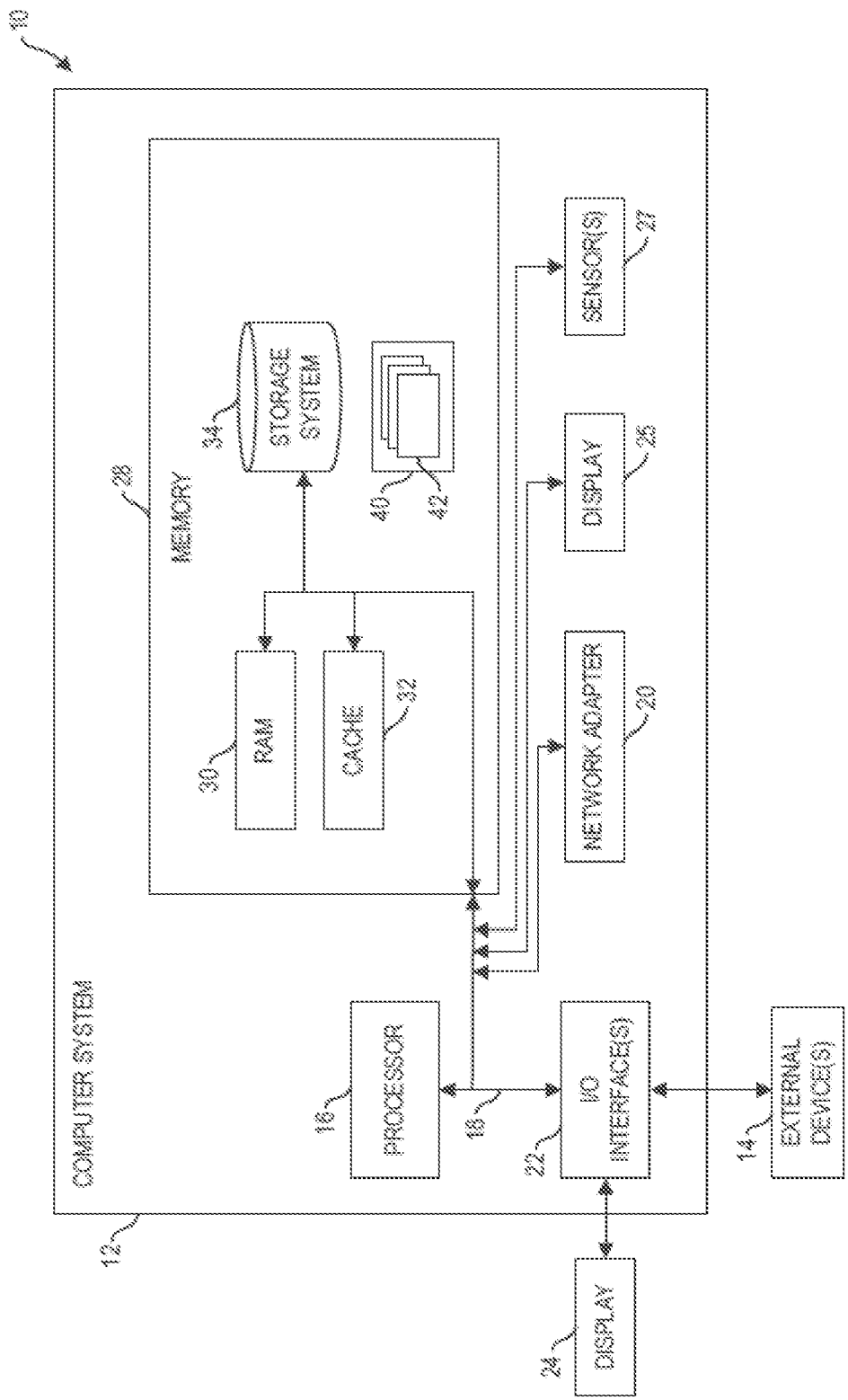
FIG. 4 depicts a cloud computing node according to an embodiment of the present invention.
Figure 5:
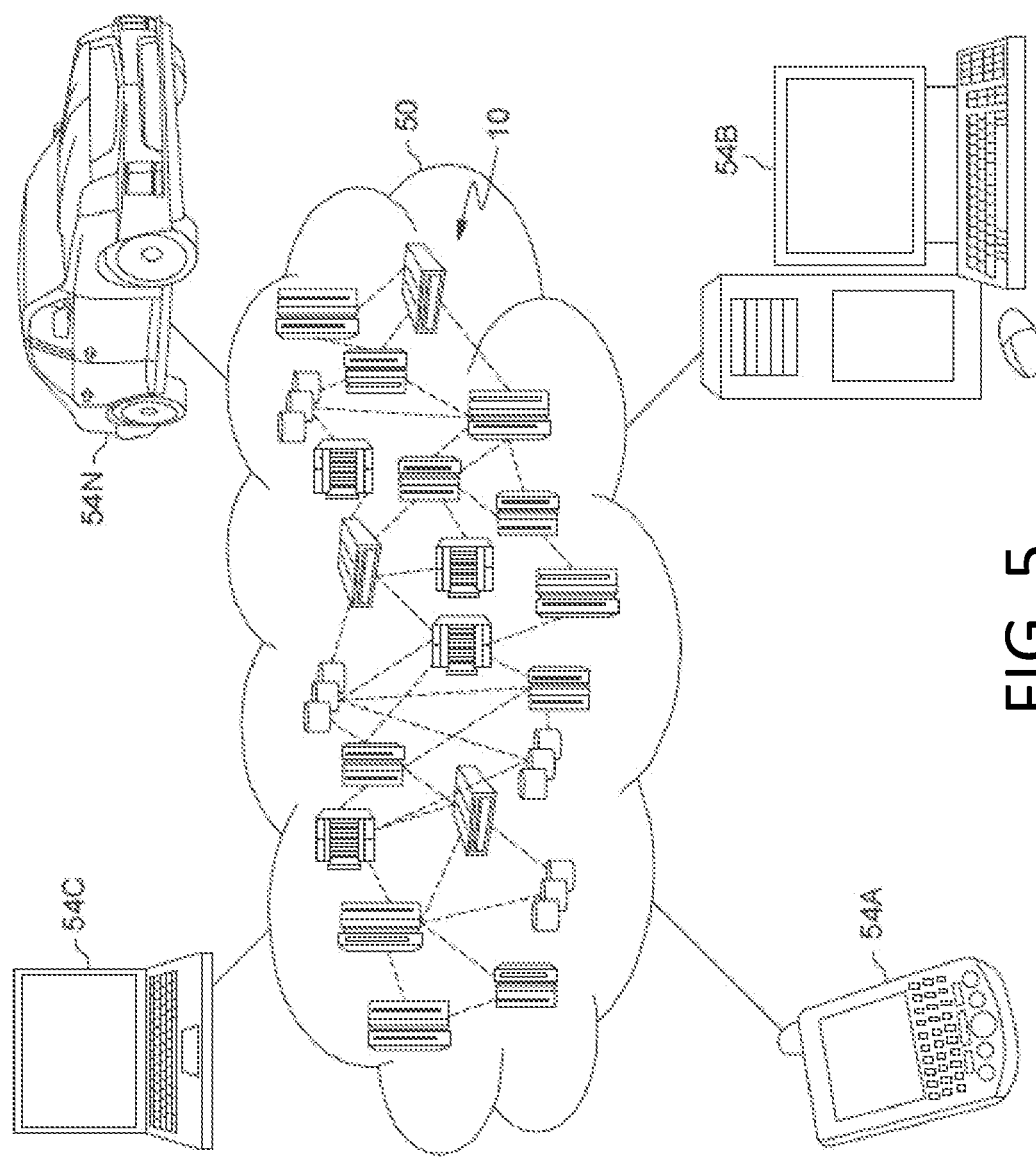
FIG. 5 depicts a cloud computing environment according to an embodiment of the present invention.
Figure 6:
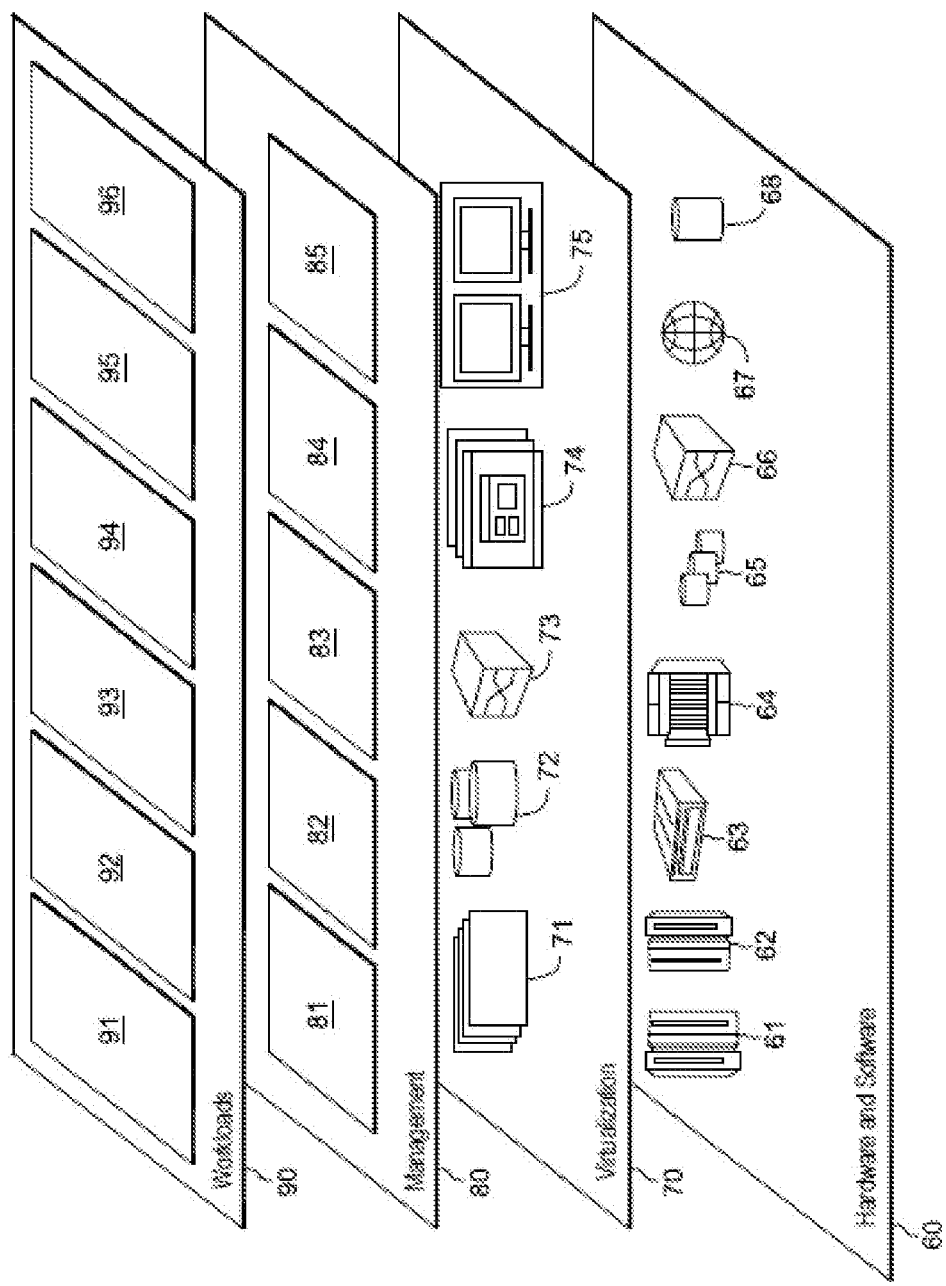
FIG. 6 depicts abstraction model layers according to an embodiment of the present invention.

FIGS. 4-6 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 4, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 5, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile memory device (e.g., a "thumb drive", "external hard drive"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the homophily transfer learning engine 120 and the DTLN population 170 of FIG. 1, respectively. Program processes 42, as in the homophily transfer learning engine 120 and the DTLN population 170 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18.

In addition to or in place of having external devices 14 and the display 24, which can be configured to provide user interface functionality, computing node 10 in one embodiment can include another display 25 connected to bus 18. In one embodiment, the display 25 can be configured as a touch screen render and can be configured to provide user interface functionality, e.g. can facilitate virtual keyboard functionality and input of total data. Computer system 12 in one embodiment can also include one or more sensor device 27 connected to bus 18. One or more sensor device 27 can alternatively or in addition be connected through I/O interface(s) 22. The one or more sensor device 27 can include a Global Positioning Sensor (GPS) device in one embodiment and can be configured to provide a location of computing node 10. In one embodiment, the one or more sensor device 27 can alternatively or in addition include, e.g., one or more of a camera, a gyroscope, a temperature sensor, a humidity sensor, a pulse sensor, a blood pressure (BP) sensor or an audio input device.

It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the homophily transfer learning 96, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
   obtaining, by one or more processor, a first network to a second network, wherein the first network and the second network are respective deep learning networks having a plurality of hidden layers;
   determining, by the one or more processor, a number of transferrable layers that can be transferred from the first network to the second network;
   quantifying, by the one or more processor, a homophily value between a first layer in the first network and a second layer in the second network, wherein the homophily value indicates a level of similarity between the first layer and the second layer as a preconfigured function of a first weight vector of the first layer and a second weight vector of the second layer, wherein the transferrable layers include the first layer and the second layer, and wherein the first layer and the second layer are of the same depth in the first network and the second network respectively;
   ascertaining, by the one or more processor, that the first weight vector and the second weight vector are similar enough to be combined together based on the homophily value and a homophily threshold condition; and
   combining, by the one or more processor, the first weight vector and the second weight vector to produce a new weight vector that represents both the first weight vector and the second weight vector.

2. The computer implemented method of claim 1, wherein the number of transferrable layers guarantees that a transfer of weight vectors corresponding to layers would be bounded by a length of the shorter of the first network and the second network.

3. The computer implemented method of claim 1, wherein the preconfigured function to measure the homophily value between the first layer and the second layer is based on a normalized dot product value of the first weight vector and a fill-up vector for the first weight vector and the second weight vector.

4. The computer implemented method of claim 3, wherein the fill-up vector for the first weight vector and the second weight vector enables dot product operation between the first weight vector and the second weight vector when the a length of the first weight vector and a length of the second weight vector are distinctive.

5. The computer implemented method of claim 4, wherein the fill-up vector for the first weight vector and the second weight vector is formed by adapting a shorter weight vector between the first weight vector and the second weight vector to a longer weight vector of the first weight vector and the second weight vector by filling up a length of the longer weight vector for the shorter weight vector with weights from the longer weight vector.

6. The computer implemented method of claim 4, the combining comprising:
   ascertaining that the length of the first weight vector and the length of the second weight vector are distinctive; and
   averaging the longer weight vector and the fill-up vector for respective weights in the new weight vector.

7. The computer implemented method of claim 1, the combining comprising:
   ascertaining that the first weight vector and the second weight vector are of the same length; and
   averaging the first weight vector and the second weight vector for respective weights in the new weight vector.

8. A computer program product comprising:
   a computer readable storage medium readable by one or more processor and storing instructions for execution by the one or more processor for performing a method comprising:
   obtaining a first network to a second network, wherein the first network and the second network are respective deep learning networks having a plurality of hidden layers;
   determining a number of transferrable layers that can be transferred from the first network to the second network;
   quantifying a homophily value between a first layer in the first network and a second layer in the second network, wherein the homophily value indicates a level of similarity between the first layer and the second layer as a preconfigured function of a first weight vector of the first layer and a second weight vector of the second layer, wherein the transferrable layers include the first layer and the second layer, and wherein the first layer and the second layer are of the same depth in the first network and the second network respectively;
   ascertaining that the first weight vector and the second weight vector are similar enough to be combined together based on the homophily value and a homophily threshold condition; and
   combining the first weight vector and the second weight vector to produce a new weight vector that represents both the first weight vector and the second weight vector.

9. The computer program product of claim 8, wherein the number of transferrable layers guarantees that a transfer of weight vectors corresponding to layers would be bounded by a length of the shorter of the first network and the second network.

10. The computer program product of claim 8, wherein the preconfigured function to measure the homophily value between the first layer and the second layer is based on a normalized dot product value of the first weight vector and a fill-up vector for the first weight vector and the second weight vector.

11. The computer program product of claim 10, wherein the fill-up vector for the first weight vector and the second weight vector enables dot product operation between the first weight vector and the second weight vector when the a length of the first weight vector and a length of the second weight vector are distinctive.

12. The computer program product of claim 11, wherein the fill-up vector for the first weight vector and the second weight vector is formed by adapting a shorter weight vector between the first weight vector and the second weight vector to a longer weight vector of the first weight vector and the second weight vector by filling up a length of the longer weight vector for the shorter weight vector with weights from the longer weight vector.

13. The computer program product of claim 12, the combining comprising:
   ascertaining that the length of the first weight vector and the length of the second weight vector are distinctive; and
   averaging the longer weight vector and the fill-up vector for respective weights in the new weight vector.

14. The computer program product of claim 8, the combining comprising:
   ascertaining that the first weight vector and the second weight vector are of the same length; and
   averaging the first weight vector and the second weight vector for respective weights in the new weight vector.

15. A system comprising:
   a memory;
   one or more processor in communication with the memory; and
   program instructions executable by the one or more processor via the memory to perform a method comprising:
   obtaining a first network to a second network, wherein the first network and the second network are respective deep learning networks having a plurality of hidden layers;
   determining a number of transferrable layers that can be transferred from the first network to the second network, wherein the number of transferrable layers guarantees that a transfer of weight vectors corresponding to layers would be bounded by a length of the shorter of the first network and the second network;
   quantifying a homophily value between a first layer in the first network and a second layer in the second network, wherein the homophily value indicates a level of similarity between the first layer and the second layer as a preconfigured function of a first weight vector of the first layer and a second weight vector of the second layer, wherein the transferrable layers include the first layer and the second layer, and wherein the first layer and the second layer are of the same depth in the first network and the second network respectively;
   ascertaining that the first weight vector and the second weight vector are similar enough to be combined together based on the homophily value and a homophily threshold condition; and
   combining the first weight vector and the second weight vector to produce a new weight vector that represents both the first weight vector and the second weight vector.

16. The system of claim 15, wherein the preconfigured function to measure the homophily value between the first layer and the second layer is based on a normalized dot product value of the first weight vector and a fill-up vector for the first weight vector and the second weight vector.

17. The system of claim 16, wherein the fill-up vector for the first weight vector and the second weight vector enables dot product operation between the first weight vector and the second weight vector when the a length of the first weight vector and a length of the second weight vector are distinctive.

18. The system of claim 17, wherein the fill-up vector for the first weight vector and the second weight vector is formed by adapting a shorter weight vector between the first weight vector and the second weight vector to a longer weight vector of the first weight vector and the second weight vector by filling up a length of the longer weight vector for the shorter weight vector with weights from the longer weight vector.

19. The system of claim 18, the combining comprising:
ascertaining that the length of the first weight vector and the length of the second weight vector are distinctive; and
averaging the longer weight vector and the fill-up vector for respective weights in the new weight vector.

20. The system of claim 15, the combining comprising:
ascertaining that the first weight vector and the second weight vector are of the same length; and
averaging the first weight vector and the second weight vector for respective weights in the new weight vector.

* * * * *